US007529814B2

(12) United States Patent
Wadia et al.

(10) Patent No.: US 7,529,814 B2
(45) Date of Patent: May 5, 2009

(54) AUTONOMIC COMPUTING ALGORITHM FOR IDENTIFICATION OF AN OPTIMUM CONFIGURATION FOR A WEB INFRASTRUCTURE

(75) Inventors: Noshir C. Wadia, Morgan Hill, CA (US); Peng Ye, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 10/686,988

(22) Filed: Oct. 15, 2003

(65) Prior Publication Data

US 2005/0086331 A1 Apr. 21, 2005

(51) Int. Cl.
*G06F 15/177* (2006.01)
(52) U.S. Cl. .................. 709/220; 709/224; 709/221; 707/1
(58) Field of Classification Search .......... 709/224, 709/203, 220, 221; 700/30; 703/22; 370/254; 707/101, 1; 705/64
See application file for complete search history.

(56) References Cited

U.S. PATENT DOCUMENTS

| 5,819,030 | A | 10/1998 | Chen et al. ............. 395/200.5 |
|---|---|---|---|
| 6,014,669 | A | 1/2000 | Slaughter et al. ............. 707/10 |
| 6,125,408 | A | 9/2000 | McGee et al. ................. 710/8 |
| 6,182,206 | B1 | 1/2001 | Baxter ......................... 712/43 |
| 6,202,190 | B1 | 3/2001 | Rogier ....................... 714/815 |
| 6,304,913 | B1 | 10/2001 | Rune .......................... 709/241 |
| 6,408,300 | B1 * | 6/2002 | Bergman et al. ........... 707/101 |
| 6,453,426 | B1 | 9/2002 | Gamache et al. .............. 714/4 |
| 6,801,940 | B1 * | 10/2004 | Moran et al. ................ 709/224 |
| 7,366,108 | B2 * | 4/2008 | Szentesi et al. ............. 370/254 |
| 2002/0010852 | A1 | 1/2002 | Arnold et al. ................. 713/1 |
| 2002/0072956 | A1 | 6/2002 | Willems et al. ................ 705/10 |
| 2002/0107954 | A1 | 8/2002 | Ferguson et al. ............ 709/224 |
| 2002/0107977 | A1 | 8/2002 | Dunshea et al. ............. 709/238 |
| 2002/0112038 | A1 | 8/2002 | Hessmer et al. ............. 709/220 |
| 2002/0126701 | A1 | 9/2002 | Requena ..................... 370/469 |

(Continued)

OTHER PUBLICATIONS

"SQL Server Configuration Performance Checklist" Exerpt from; http://www.sql-server-performance.com/sql_server_performance_audit5.asp, 2002.

(Continued)

*Primary Examiner*—Jungwon Chang
(74) *Attorney, Agent, or Firm*—Kunzler & McKenzie

(57) ABSTRACT

The present invention discloses a method, system and article of manufacture for autonomic identification of an optimum hardware configuration for a Web infrastructure. A plurality of performance objectives and a plurality of best practice rules for the Web infrastructure are established first. Then, a search space and a current configuration performance index within the search space are established. Next, a database of available hardware models is searched for a best-fit configuration based on the established plurality of best practice rules and the established current configuration performance index. The performance data of the found best-fit configuration is calculated using a performance simulator and then compared to the established plurality of performance objectives. If the calculated performance data meet the established plurality of performance objectives, then the best-fit configuration is designated as the optimum hardware configuration. Otherwise, the search space is narrowed and searching is continued until such optimum hardware configuration is found.

20 Claims, 6 Drawing Sheets

U.S. PATENT DOCUMENTS

| | | | | |
|---|---|---|---|---|
| 2002/0138443 | A1* | 9/2002 | Schran et al. | 705/64 |
| 2003/0208284 | A1* | 11/2003 | Stewart et al. | 700/30 |
| 2003/0229695 | A1* | 12/2003 | Mc Bride | 709/224 |
| 2004/0205120 | A1* | 10/2004 | Dar et al. | 709/203 |
| 2007/0005330 | A9* | 1/2007 | Hardwick et al. | 703/22 |

OTHER PUBLICATIONS

Aversa, R.; Mazzocca, N.; Villano, U.; "Design of a Simulator of Heterogeneous Computing Environments", *Simulation Practice and Theory*, vol. 4, Issues 2-3, May 15, 1996, pp. 97-117.

\* cited by examiner

Table 1 - SMP Size Rules

Table 2 - Vertical/Horizontal Solution Rules

Assume *CurrConfigPerfIndex* = 900;

*ClusterNumNodes* = QUOTIENT(*CurrConfigPerfIndex*, *ModelPerfIndex*);

*ClusterPerfIndex* = *ClusterNumNodes* * *ModelPerfIndex*;

*DeltaPerfIndex* = (*CurrConfigPerfIndex* - *ClusterPerfIndex*);

| Brand Name | Model Name | Model PerfIndex | Cluster NumNodes | Cluster PerfIndex | Delta PerfIndex |
|---|---|---|---|---|---|
| A | AM-1 | 100 | 9 | 900 | 0 |
| A | AM-2 | 85 | 10 | 850 | 50 |
| A | AM-3 | 62 | 14 | 868 | 32 |
| ... | ... | ... | ... | ... | ... |
| A | AM-n | 5 | 180 | 900 | 0 |
| B | BM-1 | 77 | 11 | 847 | 53 |
| B | BM-2 | 52 | 17 | 884 | 16 |
| ... | ... | ... | ... | ... | ... |
| B | BM-m | 3 | 300 | 900 | 0 |
| C | CM-1 | 105 | 8 | 840 | 60 |
| ... | ... | ... | ... | ... | ... |

Table 3 - Brand/Model Performance Index Database

FIGURE 6

AUTONOMIC COMPUTING ALGORITHM FOR IDENTIFICATION OF AN OPTIMUM CONFIGURATION FOR A WEB INFRASTRUCTURE

FIELD OF THE INVENTION

The present invention relates generally to performance and capacity planning of the high volume Web servers, and more particularly to a method and system of an autonomic computing algorithm to identify optimum configuration for Web infrastructures.

BACKGROUND OF THE INVENTION

As e-business and its related requirements grow at "Web speed", a critical issue is whether the IT infrastructure supporting the Web sites has what it needs to provide available, scalable, fast, and efficient access to the company's information, products, and services. More than ever, CIOs (Chief Information Officers) and their teams struggle with the challenges to minimize downtime and network bottlenecks and maximize the use of the hardware and software that comprises their e-business infrastructure.

The task of planning for optimum configuration for large Web servers has become ever challenging. This is because the hardware and software structure of large Web sites are getting increasingly complex, and the characteristics of the associated workloads are at best poorly understood, or at worst, essentially unknown because the workload has yet to be implemented.

Even with this growing complexity, typical IT infrastructures can be analyzed and related models (i.e. simulators) can be developed to assist in predicting and planning how to meet future requirements. However, the results are not satisfactory. The predictions can become somewhat complex when, as is often the case, there are many different hardware and software configurations that must be tried, and there are number of performance criteria that must all be simultaneously met, while at the same time maximizing system throughput or the number of concurrent users supported by the system.

Capacity planning and performance modeling of complex computer systems generally require detailed information about the workload assumed to be running on those systems. For detailed performance studies of processors, a trace of the workload is typically used. This combined with the right model and right configuration of the processor hardware can be used to estimate the performance and capacity of a given workload with a specific performance objectives.

An intractable task in a multi-tier Web server's performance and capacity planning is to identify an optimal hardware configuration that can achieve the performance objectives of a given workload. This task has become more complex by proliferation of many different hardware and architectural options available today. The following requirements (i.e. parameters) have to be typically addressed in determining the proper hardware configuration:

Workload Type (i.e. Application Type)—Workload types include: Publish/Subscribe (e.g. search engines, media sites, event sites such as Olympics and Wimbledon), Online Shopping (e.g. most retail sites), Customer Self-Service (e.g. online banking, package tracking, airline reservations), Online Trading and Business-to-Business. These workload types demand system resources in a different way. For example, transaction volume is low-to-moderate in some and moderate-to-high in others. Online banking may require heavy interactions with the database than browsing during online shopping. Security considerations are high in some such as online trading and online banking, but low in others such as search engines and media sites.

Performance Objectives—Performance objectives include: System Throughput, Response Time, Resource Utilization, Number of Concurrent Users, etc. These performance objectives may be specified individually or collectively. When more than one objective is specified, those objectives should all be met simultaneously.

Web Infrastructure—Based on the business requirements such as scalability, security, system management, etc., there are three architectural options for Web Infrastructures: (i) Single Tier, where the Web, the application, and the database processing are all done on a single physical hardware machine; (ii) Two Tiers, where the Web and the application processing are done on a single physical hardware machine while the database processing is done on a different hardware machine; and (iii) Three Tiers, where each of the Web, the application, and the database processing is done on three different hardware machines.

Hardware Type—Various vendors such as IBM, SUN, HP and others offer wide variety of hardware brands, models and options with different performance characteristics and within different price ranges. A database of various hardware types along with their performance and capacity characteristics as claimed by the vendor is created. Within this database, all hardware types are ranked and a Performance Index (PI) representing a relative performance is assigned to each hardware type. This database is constantly updated to accommodate new hardware models and changes to the current models.

System Cluster Structure—Requirements of large computing environments are generally not satisfied with a single hardware machine. As a result, customers build a system cluster structure consisting of many hardware machines capable of communicating with each other and computing different tasks simultaneously within the cluster. There are numerous possibilities for a system cluster structure. Some customers prefer more powerful but fewer machines (i.e. Vertical Solution) while others prefer less powerful but more machines (i.e. Horizontal Solution). The choice depends on many factors such as price, business growth projections, security, ease of system management, geographical nature of the business, disaster recovery, etc.

To identify an optimal hardware configuration, the above-mentioned requirements (i.e. parameters) have to be typically addressed concurrently. As a result, the user is often required to find a best-fit solution by a trial and error method. This requires adjusting the parameters and running the model (i.e. simulator) several times before finding a solution. The number of model runs depends on the starting point (i.e. arbitrary initial parameter specification) and the result is not guaranteed to be the best-fit solution.

What is needed is an algorithm, which takes all the above requirements and complexities into the consideration, eliminates trial and error methods, and relieves the user from making multiple model runs; and by which various performance simulators can identify an optimum hardware configuration that can achieve the performance objectives of a given workload in an efficient and cost effective manner.

SUMMARY OF THE INVENTION

The present invention discloses a method, system and article of manufacture for autonomic identification of an optimum hardware configuration for a Web infrastructure. This is accomplished by first establishing a plurality of performance objectives and a plurality of best practice rules for the Web infrastructure. A search space and a current configuration performance index within the search space are established next. A database of available hardware models is searched for a best-fit configuration based on the established plurality of best practice rules and the established current configuration performance index. The performance data of the found best-fit configuration is calculated using a performance simulator and then compared to the established plurality of performance objectives. If the calculated performance data meet the established plurality of performance objectives, then the best-fit configuration is designated as the optimum hardware configuration. Otherwise, the search space is narrowed and searching is continued until such optimum hardware configuration is found.

In the present invention, the plurality of performance objectives comprises system throughput objective, response time objective, resource utilization objective, and number of concurrent users objective. The plurality of best practice rules comprises SMP Size Rules, and Vertical vs. Horizontal Solution Rules. The search space comprises a lower limit and an upper limit for performance index of the optimum hardware configuration. The database of available hardware models comprises a plurality of hardware brands, a plurality of hardware models within each of the plurality of hardware brands, and a relative performance index for each of the plurality of hardware models. The best-fit configuration conforms to the established plurality of best practice rules and has a performance index within a delta range of said established current configuration performance index. The current configuration performance index is established by taking the average of said lower limit and said upper limit of said search space.

In another embodiment of the present invention, the above-described autonomic optimum hardware configuration method may be provided as a computer system. The present invention may also be provided as an article of manufacture comprising a program storage device readable by a computer system and tangibly embodying one or more programs of instructions executable by the computer system to perform the above-described autonomic identification of an optimum hardware configuration method steps.

The present invention may be embodied in a utility program such as an autonomic hardware configuration utility program. The present invention also provides means for the user to identify an optimum hardware configuration for a Web infrastructure by first specifying a set of requirements for the Web infrastructure and then invoking the autonomic hardware configuration utility to search and find such configuration. The set of requirements comprises a workload type, a plurality of performance objectives, a Web infrastructure type, a hardware type and a desired system cluster structure.

BRIEF DESCRIPTION OF THE DRAWINGS

The present invention will become more apparent to those of ordinary skill in the art after considering the preferred embodiments described herein with reference to the attached drawings in which like reference numbers represent corresponding elements throughout:

FIG. 6 illustrates a database of available hardware brands and each of the models within a brand along with their associated relative performance index.

DETAIL DESCRIPTION OF THE PREFERRED EMBODIMENT

In the following description of the preferred embodiment, reference is made to the accompanying drawings which form a part thereof, and which is shown by way of illustration a specific embodiment in which the present invention may be practiced. It is to be understood that other embodiments may be utilized as structural changes may be made without departing from the scope of the present invention.

Hardware Environment

Figure 1:
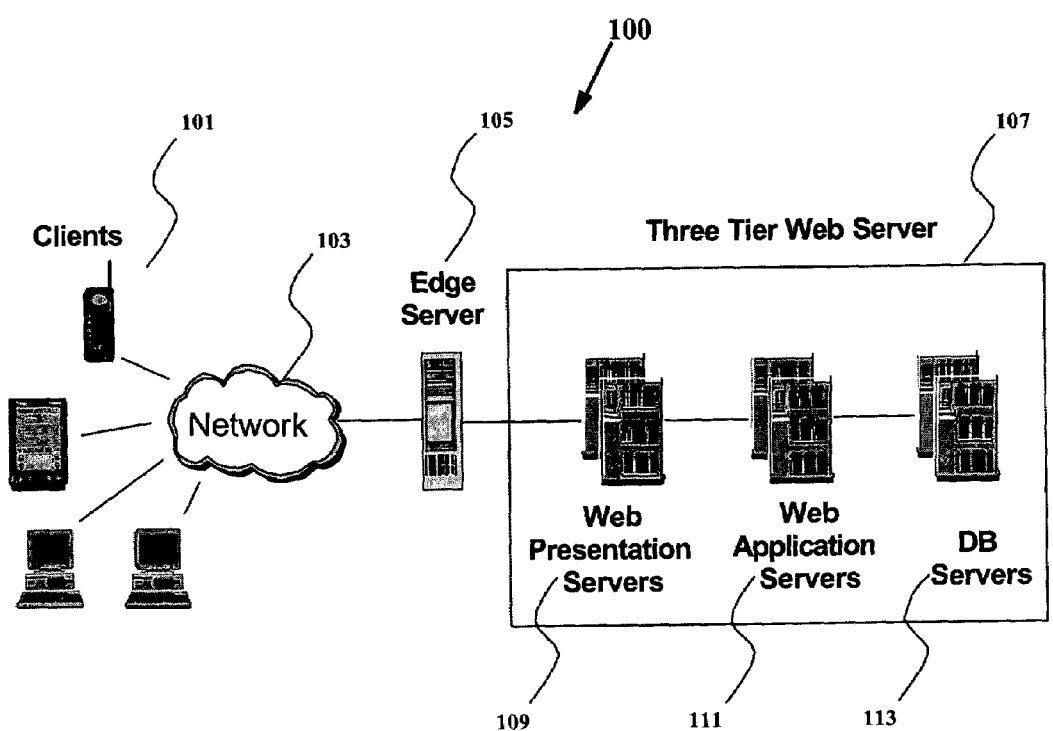
FIG. 1 illustrates an exemplary computer hardware environment that may be used in accordance with the present invention.

FIG. 1 illustrates an exemplary computer hardware environment (i.e. a sample computer system) that may be used in accordance with the present invention. In the exemplary environment, the infrastructure 100 supporting most high volume web sites typically has multiple components which include clients 101, the network 103, a special purpose server called edge server 105, and one or more computer systems with multiple layers of server machines 109, 111 and 113 within the web server 107. These multiple server machine layers are frequently called tiers, with each tier handling a particular set of functions such as serving content (i.e. web presentation servers 109), providing integration business logic (i.e. web application servers 111), or processing database transactions (i.e. database servers 113).

The clients 101 are devices that serve as the interface to the user. For example, the clients comprise a personal computer running a web browser, or a wireless device for mobile users. The type of client determines the delay associated with the client software operations for sending and receiving requests to the web server 107.

The network 103, for example the Internet, is modeled as a generic delay associated with transferring data between the web server 107 and the client 101. Specific queuing delays along the network 103, and the effects of caching and content serving within the network 103 are not modeled.

The edge server 105 is typically a special purpose server acting as an interface between the network 103 and the rest of the web server 107. It can be implemented as a single server or multiple servers acting in parallel. The edge server 105 may implement any or all of the following functions: Firewall—which implements security features, Network Dispatcher—which routes incoming requests to multiple server nodes in the next tier, and Content Caching—which holds cached copies of common content files (e.g. html, jpeg, etc.)

and supplies them directly to clients 101 without interacting with the rest of the web server 107.

The web presentation servers (i.e. HTTP servers) 109 respond to http requests from clients 101 and either supply static content if available, or pass the request on to the next tier. The presentation servers 109 are typically (but not necessarily) implemented as a number of small servers operating in parallel.

The web application servers 111 provide integration business logic needed to execute the actual web application. The web application servers 111 are typically (but not necessarily) implemented as a number of small to medium servers operating in parallel.

The database servers 113 are used to process database transactions requiring a high level of reliability, such as financial transactions. The database servers 113 are typically (but not necessarily) implemented as a single large SMP (Symmetric Multi Processor) server. A second SMP server is often configured as a standby backup server.

Those of ordinary skill in the art will recognize that present invention is not limited to the web server configuration described above. For example, the three-tier web server of the exemplary environment may be combined into a two-tier or a single-tier structure. In a two-tier structure, the presentation and application tiers are implemented on a single web server, and the database server is implemented on a physically separate server.

Those of ordinary skill in the art will further recognize that the computer system of the present invention may be comprised of a computer with one or more computer processors, one or more external storage devices, output devices such as a computer display monitor and a printer, a textual input device such as a computer keyboard, a graphical input device such as a mouse, and a memory unit. The computer system of the present invention may be a network of interacting computer devices connected to several other computer systems through various network protocols. The computer processor is connected to the external storage device, the display monitor, the printer, the keyboard, the mouse, and the memory unit. The external storage device and the memory unit may be used for the storage of data and computer program code. The external storage device may be a fixed or hard disk drive, a floppy disk drive, a CDROM drive, a tape drive, or other device locally or remotely (e.g. via Internet) connected. The functions of the present invention are performed by the computer processor executing computer program codes, which is stored in the memory unit or the external storage device. The computer system may suitably be any one of the types that are well known in the art such as a mainframe computer, a minicomputer, a workstation, or a personal computer. The computer system may run any of a number of well known computer operating systems including IBM OS/390®, IBM AS/400®, IBM OS/2®, Microsoft Windows NT®, Microsoft Windows 2000®, and many variations of OSF UNIX.

Figure 2:
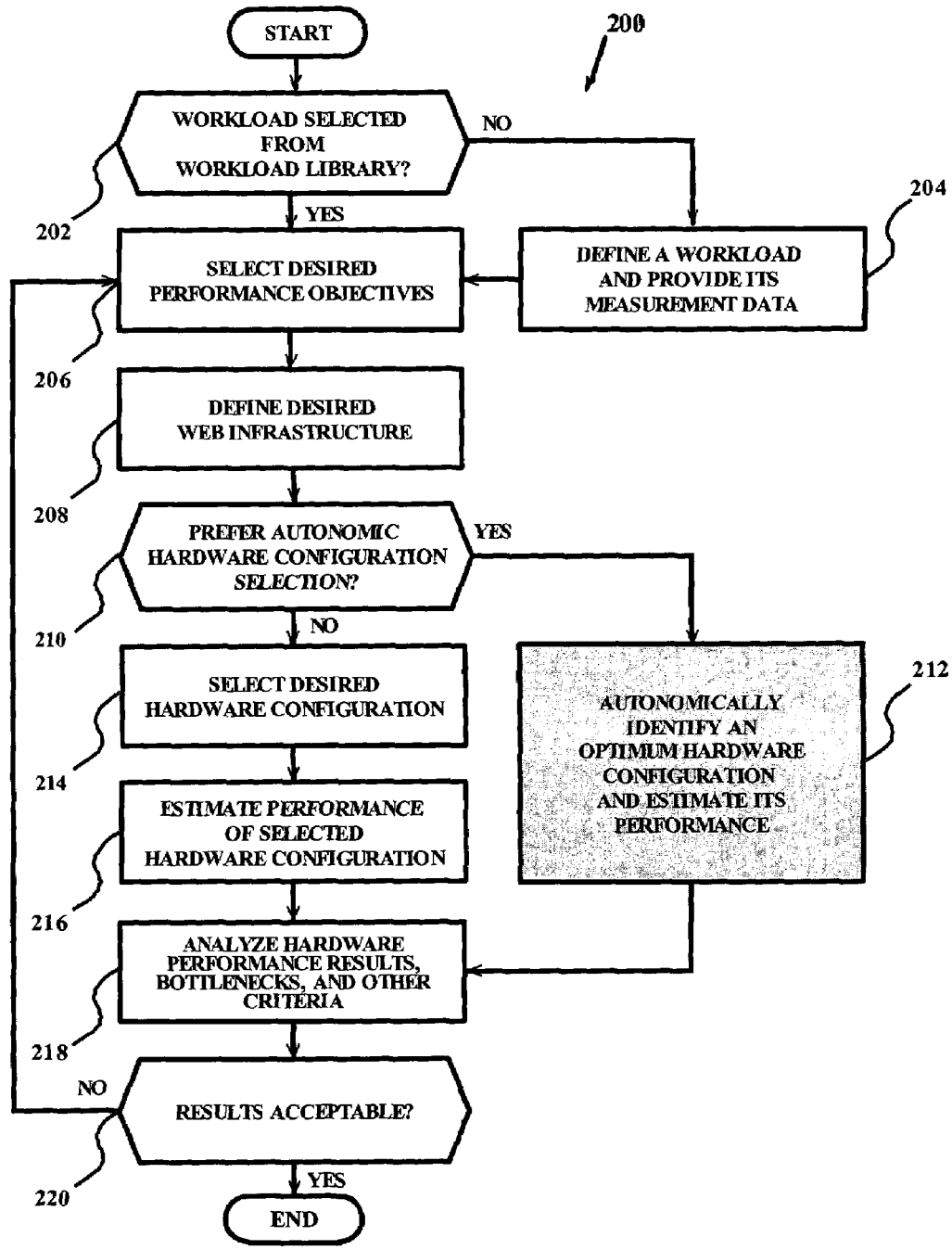
FIG. 2 illustrates an overall performance modeling process, which embodies the autonomic algorithm in accordance with the present invention.

Referring now to FIG. 2, an overall performance modeling process is illustrated. This process embodies the autonomic algorithm of the present invention for identification of an optimum hardware configuration for a Web infrastructure. This process starts in step 202, checking to see whether a workload from the workload library has been selected. The workload library has extensive records of various previously measured workloads for different workload types such as online shopping, online banking, online trading, etc. However, there may be a specific user business model that is not represented within the workload library. If user's business model is represented by one of those built-in workloads, then the appropriate workload may be selected from the workload library. Otherwise, in step 204, the user has to define his/her own workload and provide the necessary measurement data such as system throughput, resource utilization, page views per user visit, etc. A performance simulator using such process may prompt the user to enter the necessary measurement data.

In step 206, the performance objectives are selected. The user selects various desired performance objectives such as throughput, response time, number of concurrent users, etc. for his/her business needs. One or more performance objectives may be selected. When more than one objective is selected, those objectives should all be met simultaneously.

In step 208, a Web infrastructure for the selected workload is defined. Based on the business requirements of the user such as scalability, security, system management, etc., a single tier, or a multi-tier Web infrastructure as described earlier may be defined.

At step 210, a decision is made regarding the autonomic selection of a suitable hardware configuration. If the user does not prefer an autonomic selection, he/she may select his/her own hardware configuration in step 214 and estimate the performance of the selected hardware configuration in step 216. Otherwise, in step 212, the user may let the autonomic algorithm of the present invention to search for a best-fit hardware configuration and estimate the performance of the hardware configuration found. In either case, estimation for various performance parameters such as system throughput, response times, resource utilization, etc. is provided. The time spent in the system is determined and the system components where bottleneck may occur are identified. The details of the autonomic algorithm of the present invention are described later in this specification illustrated by FIG. 3.

At step 218, the hardware performance estimates and the potential bottlenecks are analyzed. Other criteria such as cost, physical size and availability of the hardware models required by the hardware configuration found may also be considered at this step. At step 220, if the results are acceptable to the user, the modeling process ends with an optimum hardware configuration obtained. Otherwise, the process may be repeated starting at step 206.

Those of ordinary skill in the art will recognize that present invention is not limited to the performance modeling process described above. Other performance modeling processes or techniques may employ the same autonomic algorithm of the present invention to identify the optimum hardware configuration needed to achieve a given set of performance objectives.

Figure 3:
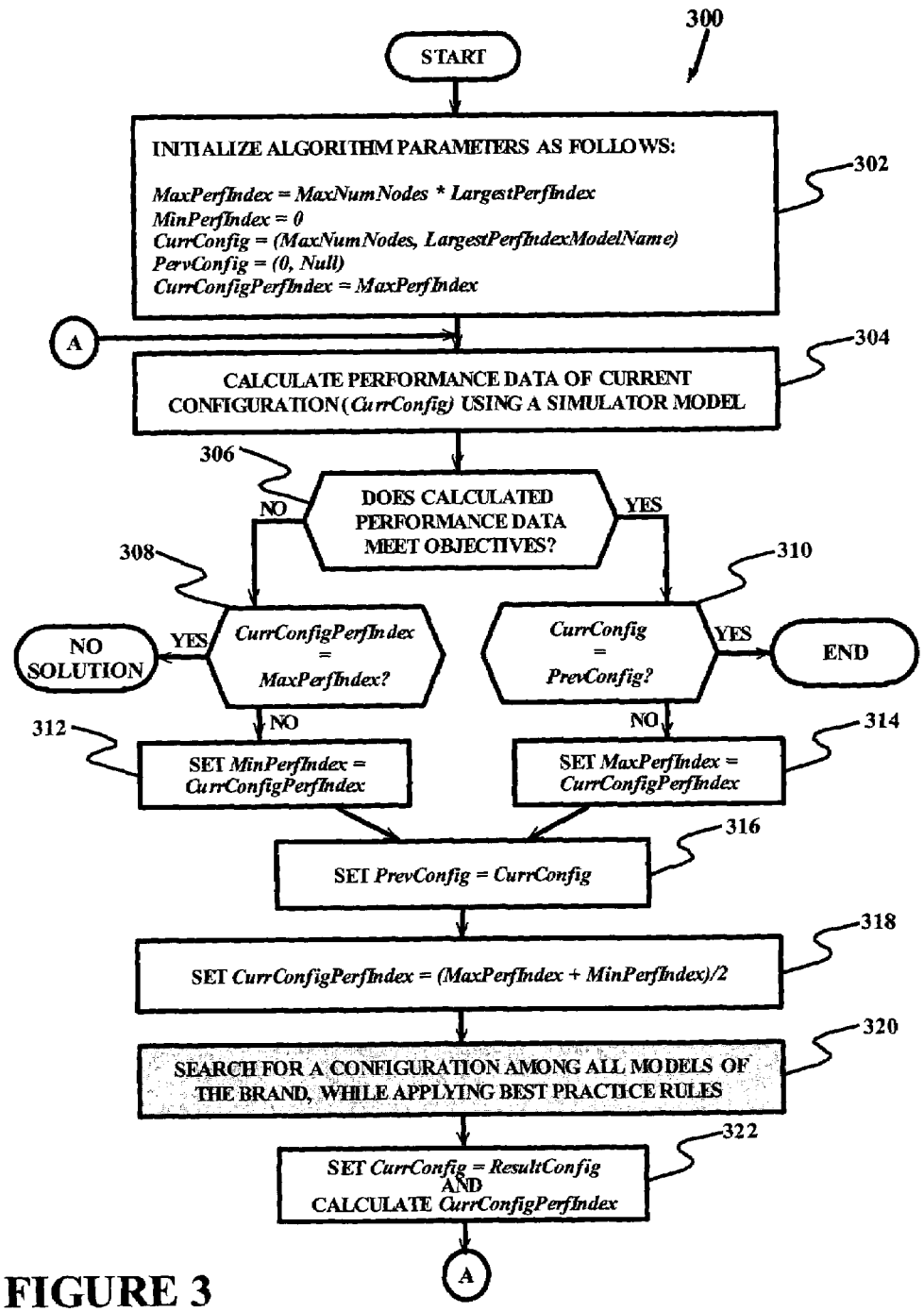
FIG. 3 illustrates a flow diagram of the steps performed by the autonomic algorithm of the present invention to identify the optimum hardware configuration.

Referring now to FIG. 3, flow diagram 300 illustrates the steps performed by the autonomic algorithm of the present invention (i.e. step 212 of FIG. 2) to identify an optimum hardware configuration and estimate its performance. The algorithm initially starts with a very large cluster of the largest hardware model within a selected hardware brand. It then iteratively narrows down the cluster to an optimum hardware configuration based on the performance objectives and the best practice rules. A database of hardware models and their assigned performance indexes is searched for the closest match at each attempt. These steps are performed for each tier of the Web infrastructure separately looking for both a Vertical and a Horizontal Solution. The best practice rules are described later in this specification illustrated by FIG. 5.

In step 302, the autonomic algorithm parameters are initialized as follows:
  MaxPerfIndex=MaxNumNodes*LargestPerfIndex,
  MinPerfIndex=0;
  CurrConfig=(MaxNumNodes, LargestPerfIndexModelName);

PrevConfig=(0, Null);
CurrConfigPerfIndex=MaxPerfIndex,

Where:

MaxPerfIndex=maximum possible performance index (i.e. the upper limit of the search space).

MaxNumNodes=maximum number of nodes in any configuration.

LargestPerfIndex=largest performance index among all models within a brand.

MinPerfIndex=minimum possible performance index (i.e. the lower limit of the search space).

CurrConfig=current hardware configuration.

LargestPerfIndexModelName=hardware model name of the largest performance index.

PrevConfig=previous hardware configuration.

CurrConfigPerfIndex=performance index of the current hardware configuration.

Each hardware type (i.e. a hardware model within a hardware brand such as IBM pSeries, IBM xSeries, IBM zSeries, Sun, etc.) has an assigned relative performance index. The relative performance indexes are established based on a combination of extensive measurement techniques and modeling applications. In general, the respective vendors publish these relative performance indexes when a particular hardware model becomes available. The relative performance indexes are used to compare the performance of different hardware models within each brand. Additional measurements are done to establish proprietary relationships between different brands. As a result, relative performance indexes of different brands may also be compared to each other. A database of all possible hardware models with their names and relative performance indexes is created and periodically updated to include new and upgraded hardware models.

The maximum possible performance index (MaxPerfIndex) is initialized to the product of the maximum number of nodes (i.e. hardware models) in any given configuration (MaxNumNodes), for example 256, and the largest performance index among all models within a brand (LargestPerfIndex). The minimum possible performance index (MinPerfIndex) is initialized to zero. The space between the maximum possible performance index and the minimum possible performance index is the search space for optimum hardware configuration.

The current hardware configuration (CurrConfig) is set to a cluster comprising maximum number of nodes (i.e. the hardware model) with the largest performance index (MaxNumNodes, LargestPerfIndexModelName). The previous hardware configuration (PrevConfig) is initialized to a null hardware configuration (0, Null). The current hardware configuration performance index (CurrConfigPerfIndex) is initialized to the maximum possible performance index (MaxPerfIndex).

In step 304, using a performance simulator model, the performance measurements of the current hardware configuration (CurrConfig) are calculated. The calculated performance measurements are then compared to the performance objectives of the user workload, in step 306. If the user performance objectives are not met, the current configuration performance index (CurrCongfigPerfIndex) is compared to the maximum possible performance index (MaxPerfIndex) at step 308. If the current configuration performance index is same as the maximum possible performance, then there is no optimum solution for meeting the selected performance objectives of the user. Otherwise, the algorithm proceeds to step 312 where the lower limit of the search space is determined by setting the minimum performance index (MinPerfIndex) to the current configuration performance index (CurrConfigPerfIndex).

If, in step 306, the performance objectives of the user are met by the current configuration, the current configuration (CurrConfig) is compared to the previous configuration (PrevConfig) at step 310. If the current configuration is same as the previous configuration, then an optimum configuration for meeting the selected performance objectives of the user is found. Otherwise, the algorithm proceeds to step 314 where the upper limit of the search space is determined by setting the maximum performance index (MaxPerfIndex) to the current configuration performance index (CurrConfigPerfIndex).

At step 316, the current configuration (CurrConfig) is saved as previous configuration (PrevConfig) and a new value for the current configuration performance index (CurrConfigPerfIndex) is set to the average of the maximum performance index (MaxPerfIndex) and the minimum performance index (MinPerfIndex) at step 318. A new search is then conducted within the newly established search space at step 320, which is described later in this specification using FIG. 4.

At step 322, the current configuration (CurrConfig) is set to the search result configuration (ResultConfig) of the step 320 and the current configuration performance index (CurrConfigPerfIndex) is calculated by multiplying the number of nodes (NumNodes) in the search result configuration to the performance index of the model (ModelPerfIndex) in the search result configuration. The algorithm is then reiterated at step 304.

Those of ordinary skill in the art will recognize that other calculation methodologies and different order of calculations may be adopted in place of the above-described calculations. The search space could iteratively be narrowed or divided into smaller ranges using other methods or techniques until exhausted.

Figure 4:
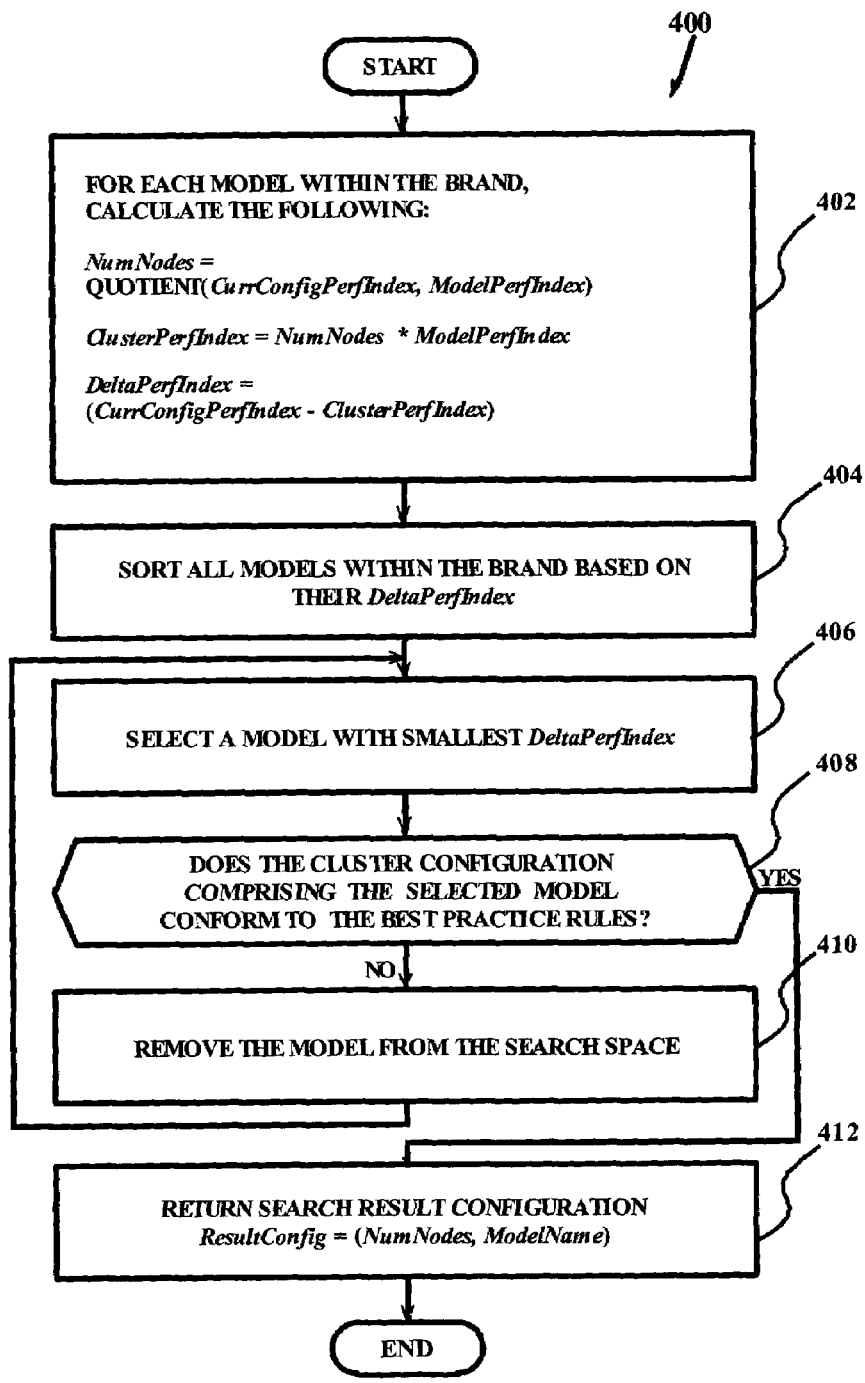
FIG. 4 illustrates a flow diagram of the steps performed to search for a possible hardware configuration conforming to the best practice rules.

Referring now to FIG. 4, flow diagram 400 illustrates the steps performed to search for a possible hardware configuration (i.e. cluster) within the search space based on the current configuration performance index. The searching is done in a database of all hardware models of the specified hardware brand (as illustrated in FIG. 6) while applying the best practice rules along the way. The search will be conducted once for a Vertical Solution and once for the Horizontal Solution. When a hardware model fails the best practice rules test, it is removed from the search space.

In step 402, for each hardware model within a hardware brand, a cluster configuration is formed as follows:

NumNodes=QUOTIENT (CurrConfigPerfIndex, ModelPerfIndex)

ClusterConfig=(NumNodes, ModelName)

ClusterConfigPerfIndex=NumNodes*ModelPerfIndex

DeltaPerfIndex=CurrConfigPerfIndex−ClusterConfigPerfIndex

Where:

NumNodes is the number of nodes in a cluster with a collective performance index of at least the performance index of the current configuration. NumNodes is same as the QUOTIENT of the current configuration performance index (CurrConfigPerfIndex) and the model performance index (ModelPerfIndex). The QUOTIENT of (a, b) is obtained by dividing (a) by (b) and taking the integer part of the result.

ClusterConfig is a cluster configuration comprising a number of a particular hardware model. The number of nodes in the cluster is same as the NumNodes.

ClusterConfigPerfIndex is the performance index of the cluster configuration. Its value is the product of the number of nodes in the cluster (NumNodes) and the performance index of the hardware model (ModelPerfIndex) in the cluster.

DeltaPerfIndex of each model is the delta difference between the current configuration performance index (CurrConfigPerfIndex) and the performance index of the cluster configuration (ClusterPerfIndex).

In step 404, the hardware models within a brand are sorted based on their DeltaPerfIndex. At step 406, a model with smallest DeltaPerfindex is selected and then in step 408, it is checked to see whether the cluster configuration comprising the selected model conforms to the best practice rules. If the cluster configuration conforms to the best practice rules, it is returned as the search result configuration (ResultConfig) at step 412. Otherwise, the hardware model, which caused the cluster configuration to fail the best practice rules test, is removed from the search space at step 410. The process steps 406, 408 and 410 are repeated until a cluster configuration, which conforms to the best practice rules, is found.

Figure 5:
FIG. 5 illustrates the best practice rules adopted by the autonomic algorithm of the present invention.
Figure 5:
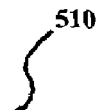

FIG. 5 illustrates the best practice rules adopted by the autonomic algorithm of the present invention. These rules are defined based on extensive measurement experiences gained within IBM and by IBM customers throughout the years.

The first set of rules deal with the SMP (Symmetric Multi-Processor) size. In FIG. 5, Table-1 505 shows the recommended SMP size for each tier of the Web Infrastructure. For example, in a Two Tier Web Infrastructure, it is recommended that Tier-1 would be a server machine with a SMP size of at least a 2-way SMP and no larger than a 12-way SMP, and Tier-2 would be a server machine with a SMP size of at least a 2-way SMP.

The second set of rules deal with the Vertical vs. Horizontal Solution. In FIG. 5, Table-2 510 shows the rules defined for the Vertical and Horizontal Solutions. In a Vertical Solution, the hardware configuration is comprised of fewer larger systems, and in a Horizontal Solution, the hardware configuration is comprised of many smaller systems. For a Vertical Solution, the ratio of SMP size to the number of nodes should be greater than 1.5 and for the Horizontal Solution, the ratio of the number of nodes to the SMP size should be greater than 1.5.

FIG. 6, Table-3 605, illustrates a database of available hardware brands and each of the models within a brand along with their associated relative performance index. Within this database, all hardware models are ranked and a Performance Index (PI) representing a relative performance is assigned to each hardware model. This database is constantly updated to accommodate new hardware models and changes to the current models.

For a given hardware configuration, Table-3 605 shows how the current configuration performance index (e.g. CurrConfigPerfIndex=900;) is used in finding a cluster of a specific hardware model within the database which conforms to the established best practice rules.

Those of ordinary skill in the art will recognize that the present invention and the autonomic algorithm described above are not limited to a specific hardware or a specific computer system or a specific set of rules. The above algorithm can be extended to more detailed modeling in a number of different ways. For example, other set of rules can be used to further narrow or expand the search space, or more specific hardware brand or model could be target of such algorithm.

Those of ordinary skill in the art will further recognize that although the autonomic algorithm of the present invention is originally intended for modeling of complex web sites, the algorithm can be equally applied to other computer systems. For example, the algorithm can be used in modeling a network of interacting computer devices, multi-tiered hardware systems, raid disks, paging operations, or other hardware facilities such as busses, network connections, and edge servers. Using this algorithm, typical IT infrastructures can be analyzed and optimum configuration of devices can be formed to assist users in predicting and planning how to meet future requirements.

What is claimed is:

1. A method implemented on a processor and a memory programmed for autonomic identification of an optimum hardware configuration for a Web infrastructure, said method comprising:
   (a) establishing a plurality of performance objectives and a plurality of best practice rules for said Web infrastructure;
   (b) establishing a search space and a current configuration performance index value within said search space;
   (c) searching a database of available hardware models for a best-fit configuration based on said established plurality of best practice rules and based on said established current configuration performance index value, each hardware model having an associated relative performance index value;
   (d) calculating performance data of said found best-fit configuration using a performance simulator;
   (e) comparing said calculated performance data to said established plurality of performance objectives; and
   (f) in response to said calculated performance data meeting said established plurality of performance objectives, designating said best-fit configuration as an optimum hardware configuration; and
   in response to said calculated performance data not meeting said established plurality of performance objectives, narrowing said search space and repeating steps (b) thru (f) until said search space is exhausted or a best-fit configuration is designated.

2. The method of claim 1, wherein said plurality of performance objectives comprises system throughput objective, response time objective, resource utilization objective, and number of concurrent users objective.

3. The method of claim 1, wherein the plurality of best practice rules comprises Symmetric Multi Processor (SMP) Size Rules, and Vertical vs. Horizontal Solution Rules.

4. The method of claim 1, wherein said search space comprises a set of available hardware models, the hardware models having an associated relative performance index value ranging between a lower limit performance index value and an upper limit performance index value.

5. The method of claim 1, wherein said database of available hardware models comprises a plurality of hardware brands, a plurality of hardware models within each said plurality of hardware brands, and a relative performance index value for each of said plurality of hardware models.

6. The method of claim 1, wherein said best-fit configuration conforms to said established plurality of best practice rules and has a performance index value within a delta range of said established current configuration performance index value.

7. The method of claim 1, wherein said current configuration performance index value is established by taking the average of a lower limit and an upper limit of said search space.

8. A computer system for autonomic identification of an optimum hardware configuration for a Web infrastructure, said computer system comprising: a computer; and one or more computer programs executed by said computer system for:

(a) establishing a plurality of performance objectives and a plurality of best practice rules for said Web infrastructure;
(b) establishing a search space and a current configuration performance index value within said search space;
(c) searching a database of available hardware models for a best-fit configuration based on said established plurality of best practice rules and based on said established current configuration performance index value, each hardware model having an associated relative performance index value;
(d) calculating performance data of said found best-fit configuration using a performance simulator;
(e) comparing said calculated performance data to said established plurality of performance objectives; and
(f) in response to said calculated performance data meeting said established plurality of performance objectives, designating said best-fit configuration as an optimum hardware configuration; and
in response to said calculated performance data not meeting said established plurality of performance objectives, narrowing said search space and repeating steps (b) thru (f) until said search space is exhausted or a best-fit configuration is designated.

9. The computer system of claim 8, wherein said plurality of performance objectives comprises system throughput objective, response time objective, resource utilization objective, and number of concurrent users objective.

10. The computer system of claim 8, wherein the plurality of best practice rules comprises Symmetric Multi Processor (SMP) Size Rules, and Vertical vs. Horizontal Solution Rules.

11. The computer system of claim 8, wherein said search space comprises a set of available hardware models, the hardware models having an associated relative performance index value ranging between a lower limit performance index value and an upper limit performance index value.

12. The computer system of claim 8, wherein said database of available hardware models comprises a plurality of hardware brands, a plurality of hardware models within each said plurality of hardware brands, and a relative performance index value for each of said plurality of hardware models.

13. The computer system of claim 8, wherein said best-fit configuration conforms to said established plurality of best practice rules and has a performance index value within a delta range of said established current configuration performance index value.

14. The computer system of claim 8, wherein said current configuration performance index value is established by taking the average of a lower limit and an upper limit of said search space.

15. An article of manufacture comprising a program storage device readable by a computer system and tangibly embodying one or more programs of instructions executable by said computer system to perform a method for autonomic identification of an optimum hardware configuration for a Web infrastructure, said method comprising:
(a) establishing a plurality of performance objectives and a plurality of best practice rules for said Web infrastructure;
(b) establishing a search space and a current configuration performance index value within said search space, said search space comprising a set of available hardware models, the hardware models having an associated relative performance index value ranging between a lower limit performance index value and an upper limit performance index value;
(c) searching a database of available hardware models for a best-fit configuration based on said established plurality of best practice rules and based on said established current configuration performance index value;
(d) calculating performance data of said found best-fit configuration using a performance simulator;
(e) comparing said calculated performance data to said established plurality of performance objectives; and
(f) in response to said calculated performance data meeting said established plurality of performance objectives, designating said best-fit configuration as an optimum hardware configuration; and in response to said calculated performance data not meeting said established plurality of performance objectives, narrowing said search space and repeating steps (b) thru (f) until said search space is exhausted or a best-fit configuration is designated.

16. The article of manufacture according to claim 15, wherein said plurality of performance objectives comprises system throughput objective, response time objective, resource utilization objective, and number of concurrent users objective.

17. The article of manufacture according to claim 15, wherein the plurality of best practice rules comprises Symmetric Multi Processor (SMP) Size Rules, and Vertical vs. Horizontal Solution Rules.

18. The article of manufacture according to claim 15, wherein said database of available hardware models comprises a plurality of hardware brands, a plurality of hardware models within each said plurality of hardware brands, and a relative performance index value for each of said plurality of hardware models.

19. The article of manufacture according to claim 15, wherein said best-fit configuration conforms to said established plurality of best practice rules and has a performance index value within a delta range of said established current configuration performance index value.

20. The article of manufacture according to claim 15, wherein said current configuration performance index value is established by taking the average of a lower limit and an upper limit of said search space.

* * * * *